United States Patent
Herbert et al.

(10) Patent No.: US 7,075,552 B2
(45) Date of Patent: Jul. 11, 2006

(54) SYSTEM AND METHOD FOR DISPLAY GRID CHARACTERIZATION, CALIBRATION, AND VERIFICATION

(75) Inventors: Franz H. Herbert, Encinitas, CA (US); Daniel G. Caldwell, Cardiff-by-the-Sea, CA (US)

(73) Assignee: Integrated Color Solutions, Inc., New York, NY (US)

( * ) Notice: Subject to any disclaimer, the term of this patent is extended or adjusted under 35 U.S.C. 154(b) by 0 days.

(21) Appl. No.: 10/886,465

(22) Filed: Jul. 7, 2004

(65) Prior Publication Data

US 2006/0007240 A1    Jan. 12, 2006

Related U.S. Application Data

(63) Continuation-in-part of application No. 10/703,305, filed on Nov. 7, 2003, now Pat. No. 6,937,249, which is a continuation-in-part of application No. 10/647,641, filed on Aug. 25, 2003.

(51) Int. Cl.
    G09G 5/02    (2006.01)

(52) U.S. Cl. ............... 345/589; 345/1.1; 345/596; 345/597; 345/601; 345/604; 345/617; 345/690; 382/167; 382/169; 382/274

(58) Field of Classification Search .......... 345/1.1–3.4, 345/589, 617
    See application file for complete search history.

(56) References Cited

U.S. PATENT DOCUMENTS

| | | |
|---|---|---|
| 5,502,458 A | 3/1996 | Braudaway |
| 5,579,031 A | 11/1996 | Liang |
| 5,614,925 A | 3/1997 | Braudaway |
| 5,654,743 A | 8/1997 | Hu et al. |
| 5,661,531 A * | 8/1997 | Greene et al. ............... 349/73 |
| 6,043,797 A * | 3/2000 | Clifton et al. ............ 345/589 |
| 6,078,309 A * | 6/2000 | Chen et al. ................ 345/589 |
| 6,078,936 A | 6/2000 | Martin et al. |
| 6,081,254 A | 6/2000 | Tanaka et al. |
| 6,081,265 A | 6/2000 | Nakayama |
| 6,262,765 B1 | 7/2001 | Jeong |
| 6,292,228 B1 | 9/2001 | Cho |
| 6,559,826 B1 * | 5/2003 | Mendelson et al. ......... 345/102 |
| 6,906,727 B1 * | 6/2005 | Weibrecht et al. .......... 345/600 |
| 2002/0080168 A1 | 6/2002 | Hilliard |
| 2002/0161659 A1 | 10/2002 | Veilleux |

\* cited by examiner

*Primary Examiner*—Kee M. Tung
*Assistant Examiner*—Antonio Caschera
(74) *Attorney, Agent, or Firm*—McNair Law Firm, P.A.

(57) ABSTRACT

This invention is directed to a system and method for creating characterization information and a correction map from a first display grid that can be transmitted and used by a second display grid. Computer readable instructions embodied in a computer readable medium calibrate a first display grid and create an ICC color profile and correction map from said calibration information, such that an image to be displayed across an entire display grid which is segmented into portions corresponding to each display device in the display grid is displayed with uniform luminance and color across the entire display grid. The invention can then store the correction map and characterization information and send the information to a second display device for it to use. Alternatively, the calibration or characterization information can be associated with an image file and sent to a second location for display.

14 Claims, 10 Drawing Sheets

SYSTEM AND METHOD FOR DISPLAY GRID CHARACTERIZATION, CALIBRATION, AND VERIFICATION

CROSS-REFERENCE TO RELATED APPLICATION

This application is a continuation-in-part of patent application Ser. No. 10/703,305, entitled System And Method For Display Device Characterization, Calibration, and Verification, filed Nov. 7, 2003, which is a continuation-in-part of utility patent application Ser. No. 10/647,641, entitled System for Selecting and Creating Composition Formulations, filed Aug. 25, 2003. Therefore, this application claims priority on patent application Ser. No. 10/703,305 which claims priority on patent application Ser. No. 10/647,641.

FIELD OF THE INVENTION

This invention is related to a system and method for characterization, calibration, and verification of characterization and calibration information associated with display devices. Particularly, this invention is directed to a computerized system for characterizing or calibrating a display grid having a plurality of display devices for displaying a composite image on the display grid.

BACKGROUND OF THE INVENTION

In the present state of the art, the display size of single display devices is limited. Typically, the very largest CRT, LCD, or plasma screens are only sixty inches in width. To overcome the display size limitation, a plurality of displays have been used to create a composite display or display grid, comprising multiple display devices. However, consistent color accuracy and appearance across each of the display devices, and therefore, across the display grid, is problematic.

The ability to reproduce precise and accurate color throughout the display grid, and therefore on each display device, is a problem needing significant attention. When viewing an image on a display grid, each display device is traditionally a single screen, such as a CRT, LCD, or plasma screen. It is advantageous to calibrate each display device so that the color appearance of the entire display grid is as consistent as possible. It is also beneficial to be able to transmit the calibration and characterization information to other display grids so that these other display grids can utilize the characterization information from the original display grid.

To address these disadvantages, it is an object of this invention to provide for a system and method for calibrating multiple display devices of a display grid.

It is another object of this invention to provide a system and method for verifying characterization or calibration information of a display grid.

SUMMARY OF THE INVENTION

The objectives of this invention are achieved by providing a system for calibrating a display grid, having a plurality of display devices. The individual display devices are in communication with a computer readable medium and at least one video card. The above system uses a set of computer readable instructions found in a computer readable medium for initializing lookup table values according to a predetermined luminance level for each one of the plurality of display devices of the display grid, measuring the output of each one of the plurality of display devices of the display grid, determining the lowest luminance among the display grid from the output measurements, adjusting color values of each display device according to the lowest luminance and output measurements of the display device at the lowest luminance, determining a pixel array according to the color values for each of the display devices of the display grid, extrapolating the pixel array into a correction map for each of the display devices of the display grid so that the correction map can be used to display an image with consistent luminance and color across the display grid.

The system can also contain instructions for receiving an electronic image to be displayed across the display grid, segmenting the electronic image into segments corresponding to at least one display device of the display grid, modifying at least one segment of the electronic image according to the correction map, transmitting the luminance information for use by a second display grid, receiving information representing a determination of the second display grid's ability to utilize the luminance information, and notifying a user if the second display grid cannot utilize the luminance information. The correction map can include pixel multipliers for each pixel of each display device.

The invention can also include instructions for initializing look-up table values of at least one video card to a predetermined luminance level, measuring the output of each of the display devices according to the predetermined luminance level, determining the lowest luminance level among the display grid from the output measurement, determining a gray ramp according to the lowest luminance for each of the display devices, measuring color map information for each of the display devices at the lowest luminance level, and determining a correction map for the display grid according to the gray map and the color map.

The invention can also include instructions for segmenting the display devices into a plurality of grid areas, measuring the output of the grid areas, determining the minimal luminance level of the display grid according to the output measurements, adjusting color values of each display grid according to the minimal luminance level and the output measurements, determining a pixel array according to the color values, extrapolating the pixel array into a correction map so that the correction map can be used to display an image with consistent color and luminance across the display grid.

DESCRIPTION OF A PREFERRED EMBODIMENT

Figure 1:
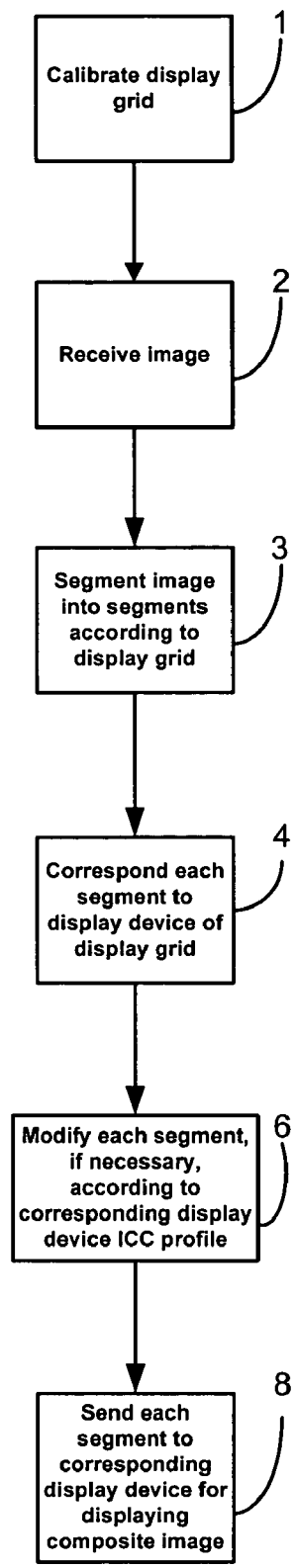
FIG. 1 is a flowchart describing the basic functions of the invention.

The detailed description that follows may be presented in terms of program procedures executed on a computer or network of computers. These procedural descriptions are representations used by those skilled in the art to most effectively convey the substance of their work to others skilled in the art. These procedures herein described are generally a self-consistent sequence of steps leading to a desired result. These steps require physical manipulations of physical quantities such as electrical or magnetic signals capable of being stored, transferred, combined, compared, or otherwise manipulated readable medium that is designed to perform a specific task or tasks. Actual computer or executable code or computer readable code may not be contained within one file or one storage medium but may span several computers or storage mediums. The terms "host" and "server" may be hardware, software, or combination of hardware and software that provides the functionality described herein. This invention thereby allows multiple users, being geographically dispersed, to interact with data relating to physical characteristics of manufactured products using a system that ensures the precise and accurate conveyance of such information (data).

The present invention is described below with reference to flowchart illustrations of methods, apparatus ("systems") and computer program products according to the invention. It will be understood that each block of a flowchart illustration can be implemented by a set of computer readable instructions or code. These computer readable instructions may be loaded onto a general purpose computer, special purpose computer, or other programmable data processing apparatus to produce a machine such that the instructions will execute on a computer or other data processing apparatus to create a means for implementing the functions specified in the flowchart block or blocks.

These computer readable instructions may also be stored in a computer readable medium that can direct a computer or other programmable data processing apparatus to function in a particular manner, such that the instructions stored in a computer readable medium produce an article of manufacture including instruction means to implement the functions specified in the flowchart block or blocks. Computer program instructions may also be loaded onto a computer or other programmable apparatus to produce a computer executed process such that the instructions are executed on the computer or other programmable apparatus providing steps for implementing the functions specified in the flowchart block or blocks. Accordingly, elements of the flowchart support combinations of means for performing the special functions, combination of steps for performing the specified functions and program instruction means for performing the specified functions. It will be understood that each block of the flowchart illustrations can be implemented by special purpose hardware based computer systems that perform the specified functions, or steps, or combinations of special purpose hardware or computer instructions. The present invention is now described more fully herein with reference to the drawings in which the preferred embodiment of the invention is shown. This invention may, however, be embodied in many different forms and should not be construed as limited to the embodiment set forth herein. Rather, these embodiments are provided so that this disclosure will be thorough and complete and will fully convey the scope of the invention to those skilled in the art.

Display devices can be calibrated in intensity, correlated color temperature, and response so that the same color appearance of a product manufactured is displayed and perceived by the viewer as if the product were located in the corresponding environment presented by the display device. Matching color intensity is the degree or depth of shade in a color. Correlated color temperature is defined as the temperature of a black body that lies closest to the u', v' coordinate in the CIELUV system. Display devices of a display grid can be calibrated for multiple illuminants. Illuminants define the spectral power distribution of visible radiation emitted from a light source. Examples of illuminants include Daylight (D65) having a color temperature of 6500 degrees Kelvin, Fluorescent (F2) having a correlated color temperature of 4158 degrees Kelvin, and Tungsten having a color temperature of 2856 degrees Kelvin. Although the illuminants cited herein are typical of those used in the industry, it is to be understood that this invention may use many other illuminants or illuminant combinations. Calibrating display grids using multiple illuminants helps insure that color constancy is maintained when reproducing images according to multiple illuminants. Another component of calibration or characterization of a display grid can include adjustment of the luminance. Luminance is the measure of emitted light and is also referred to as the brightness level. Since the luminance level influences color perception, luminance needs to be adjusted for each display device in a display grid to provide a consistent display of images. The properties of a display grid addressed above can also be referred to as the characterization information of the display grid.

FIG. 1 illustrates the function of the invention. In step 1, the computer readable instructions calibrate the display grid. The calibration process, for both color and luminance, is described in more detail below. At step 2, the computer readable instructions allow the display grid to receive an image. The image is then divided into segments according to the display grid at step 3. For example, if the display grid contains four display devices, the received image can be divided into four segments. Each of the segments can then be associated with a display device so that when displayed, the display grid shows the image as a composite of four segments. Since the display grid has been calibrated, the displayed image has been corrected for color and luminance. At step 4, the computer readable instructions associate the segments to each of the display devices in the display grid. This allows the image to be displayed across the entire display grid and provides for an image enlarged beyond the size of a single display device. If necessary, the computer readable instructions utilize the characterization information or correction map to modify each portion of the image according to the corresponding display devices at step 6. In step 8, the computer readable instructions send the modified segments of the image to each of the corresponding display devices for displaying a composite image across the display grid.

Figure 2:
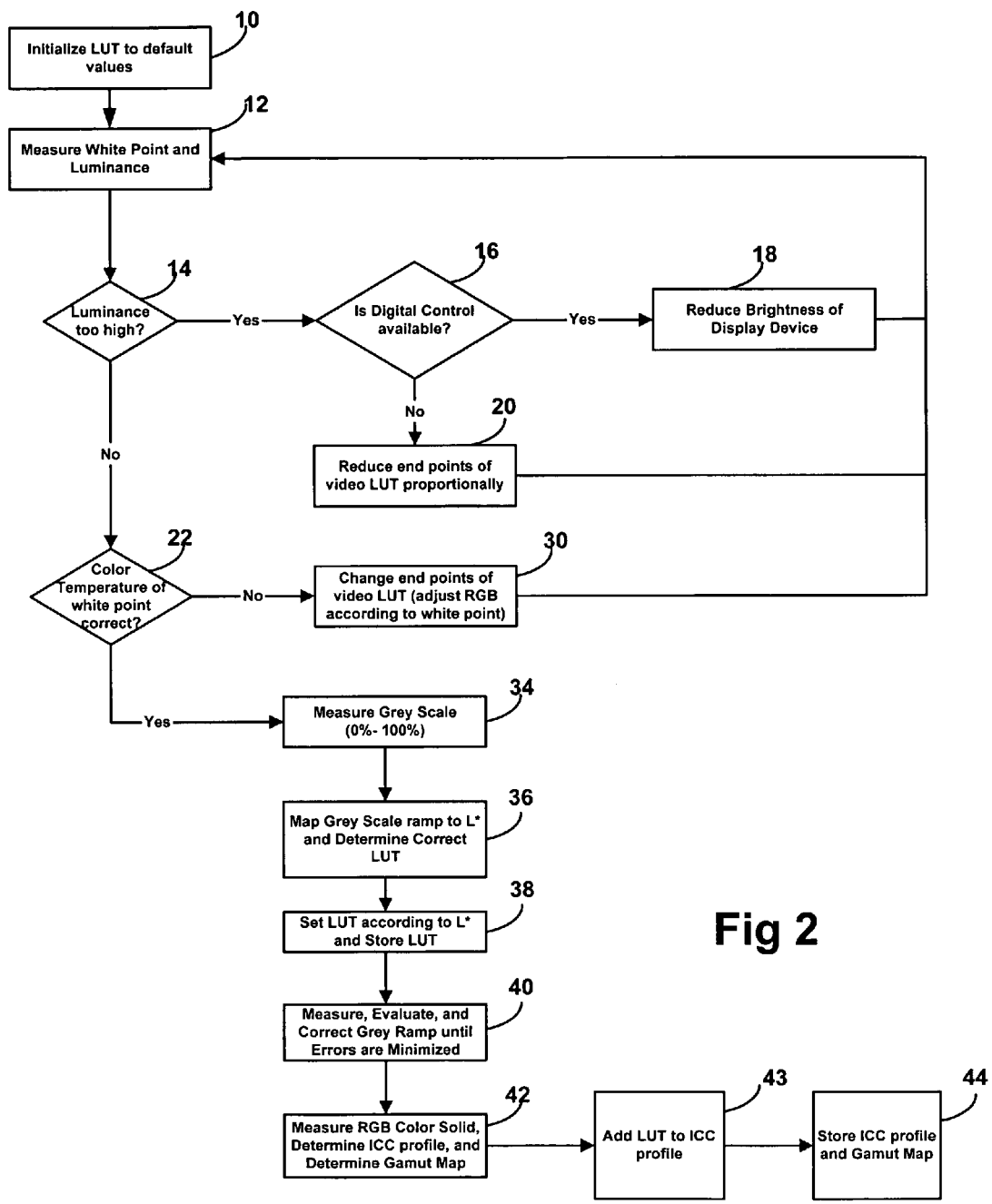
FIG. 2 is a flowchart describing a method of calibrating the display grid used by the invention.

A more detailed description of how the invention obtains the necessary characterization information and creates a correction map is demonstrated in FIG. 2. The steps shown in FIG. 2 can be performed for each display device of a color grid in order to characterize or calibrate the entire display grid. Step 10 illustrates the initialization of the Video Lookup Table (LUT) of each display device of the display grid to default values prior to measuring the white point for each display device. A LUT is a data structure that maps the gamut, also known as the color space or color range, of one device to the gamut of another device by mapping color indices into actual RGB values. The "white point" is the "whitest" white that an illuminant can produce in an illuminant dependent color space. For example, outdoors sunlight that is reflected off white generally serves as the white point for that illuminant. In a room at night, however, a single lamp's light reflected off white can serve as the "white point" for this illuminant. The white point is measured by a spectrometer or calorimeter for a specified illuminant to determine the output of each display device of the display grid in step 12. Once the display grid is measured for its white point, a spectral transfer function STF(VD1)(λ) is determined by measuring the color values, typically, for each display device a RGB signal generated by the linear combination of RGB signals from 0,0,0 to 255, 255, 255 or 0 to 100% for each color of RGB for each display device of the display grid. It is noted that while the examples of this specification use RGB to illustrate modifications to color values, other systems can be used. For example, color values associated with a display device can include LCH and LAB. If the luminance is too high at step 14 for any of the display devices, a determination is made as to whether digital control of the display device is available at step 16. If so, the brightness of the display device is reduced at step 18 and the operation returns to step 12. If digital control is not available at step 16, the end points of the LUT are reduced proportionally at step 20 thereby reducing the luminance and the operation continues to step 12. Therefore, the desirable luminance, based upon determinations from each display device, allows for an optimal luminance to be determined for the display grid. This luminance information is included in characterization information of the display. Further, the luminance information can be transmitted to a second display grid so that the second display grid can generate a second correction map to be used to display an electronic image. This allows the correlation of luminance and color between two display grids.

Figure 3:
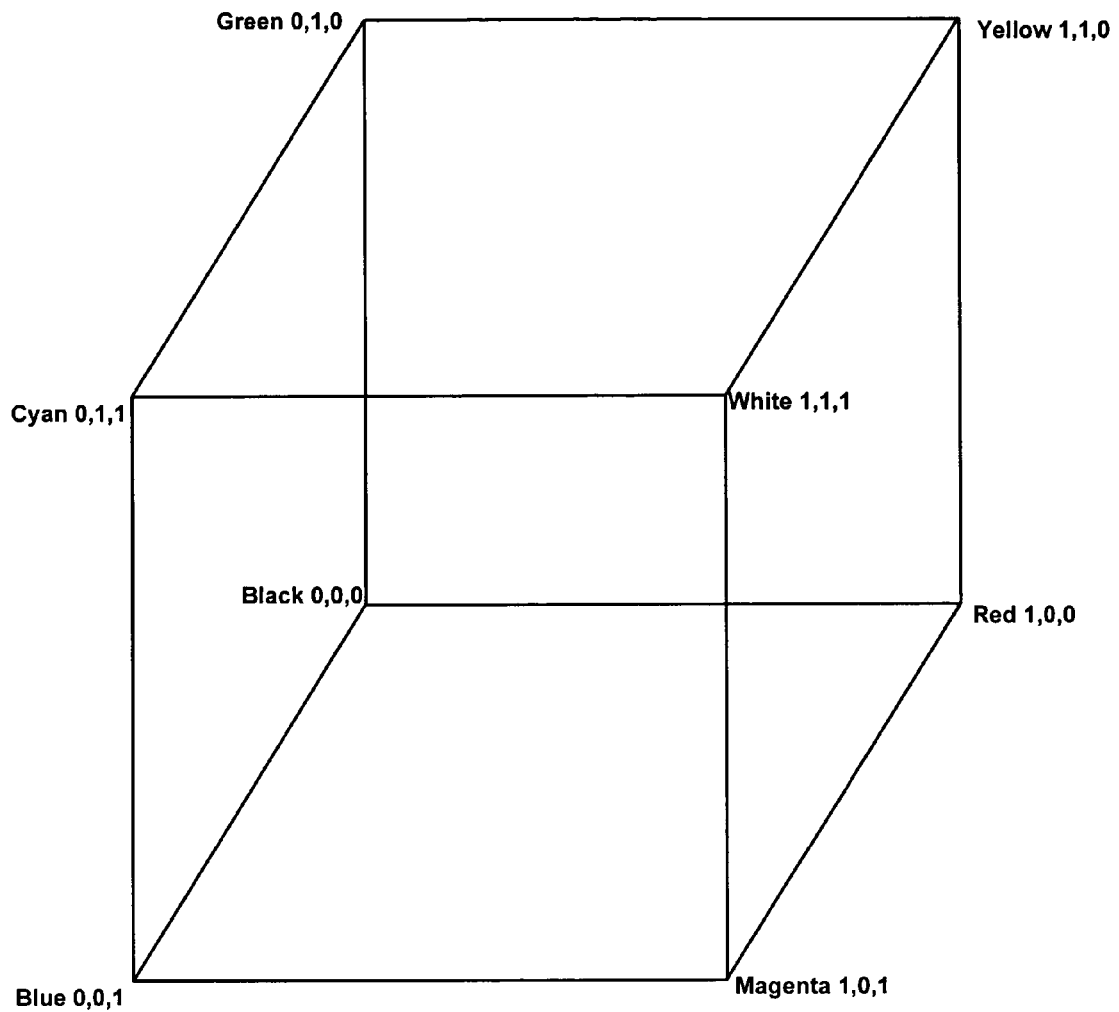
FIG. 3 is a schematic of RGB Color Space.

Once an optimal luminance is determined for the display grid, a determination of color temperature for the white point is made at step 22 for each display device. If the color temperature is not correct, the end points of the LUT for that display device are made by adjusting the RGB of the display device according to the white point at step 30. If the color temperature of the white point is correct, then a gray scale is measured at increments from black at zero percent to white at full scale, or one hundred percent, at step 34. A gray color can be generated as the RGB signals are incremented. A gray ramp is the series of colors from zero to full scale. Each new color, or incremented value of RGB, is slightly brighter than the last. An equivalent gray ramp is calculated using the CIELAB color model using the component parameter L*. L* accounts for the non-linearities in the human visual system, helping linearize these non-linear brightness/signal perceptions. At step 36, the invention maps the gray scale linearity against the lightness function L*. Step 38 sets the LUT according to the resultant values of the mapped gray scale and stores the results. The end points of the LUT are modified using the white point as a scalar value so that the total color difference is less than 0.2 unit, CIELAB ΔE*ab. The LUT is adjusted until the desired white point values are obtained from 0% black to 100% white. Step 40 measures, evaluates, and corrects the gray ramp linearity determinates until the errors are less than 0.2 units CIELAB ΔE*ab for each display device and therefore the display grid. In step 42, the RGB color solid is measured and the ICC profile is determined along with the gamut map for the display grid. A gamut map represents the obtainable colors producible by the display grid. At step 44, the ICC profile and gamut map are stored. For efficiency, the preferred embodiment measures 33 gray steps between 0% black and 100% white, representing full scale rather than the potential integer points from 0 to 100 at step 34. The 33 points corresponds to the approximate number of just noticeable differences in the component value L* of CIELAB. In a typical LUT, there are 256 points (0 to 255) between 0% black and 100% white. The values derived from these calibration procedures are stored in the LUT so that the input signal to each display device is modified thereby significantly reducing the errors in each display device. The display device is characterized, or profiled, by measuring a 3D color volume, which spans the RGB cube. The RGB cube is a representation of the RGB gamut in RGB color space. The cube is configured as a right hand co-ordinate system with XYZ mapping directly to RGB. The corners of the cube represent the primary colors of Red (R), Green (G), and Blue, (B). Referring to FIG. 3, black is shown in the lower, rear, back corner where R=0%, G=0%, and B=0% and white is shown where R=100%, G=100%, and B=100%. For illustrative purposes, the number 1 is used to represent the full-scale signal which can also be assigned the value of 255, or represented by 100%. Once the RGB values are measured, they are converted into a RGB⇒L*a*b*⇒RGB table at step 42 of FIG. 2. A standard ICC display profile is created or edited at step 42 according to the RGB⇒L*a*b*⇒RGB table. The LUT is added to the ICC profile to provide a complete characterization of the display at that moment at step 43. This process is repeated for each display of a display grid to find the correction required to each display device to provide for a calibrated display grid. Once the optimal luminance is determined and the color at this luminance is calculated for each display device, a correction map can be made that can be subsequently used for correcting images or image segments to be displayed on the display grid.

This invention also allows for the calibration of display grids at lower luminance. If a lower luminance is selected, steps 12 through 30 can be repeated at this lower luminance. This lower luminance is achieved by iteratively reducing the white end of the LUT while maintaining the correlated color temperature of the desired illuminant. In the event that a display device in the display grid can be changed through programmatical means, such as the DCC 2ci protocol by VESA, the brightness of the display device can be tentatively reduced while maintaining the corrected color temperature of the desired illuminant through gain controls. The resulting luminance values are added to the ICC profile as additional information and can be incorporated into the correction map.

Many applications use different calibration or characterization settings for displaying images. Therefore, the desired luminance is selected and the resulting ICC profile or correction map is associated with that application. Verification can be performed by displaying a set of grays and colors on the display grid, measuring the luminous output of the display grid with the spectrometer or colorimeter, and comparing the measured results to the original measurements derived by calculating L*a*b* values using the RGB⇒L*a*b* interpolation table in the ICC profile. A standardized error metric called CIELAB ΔE*ab or CIELAB ΔE94 is used to compare the magnitude and assess the visual impact of the color differences.

Figure 4:
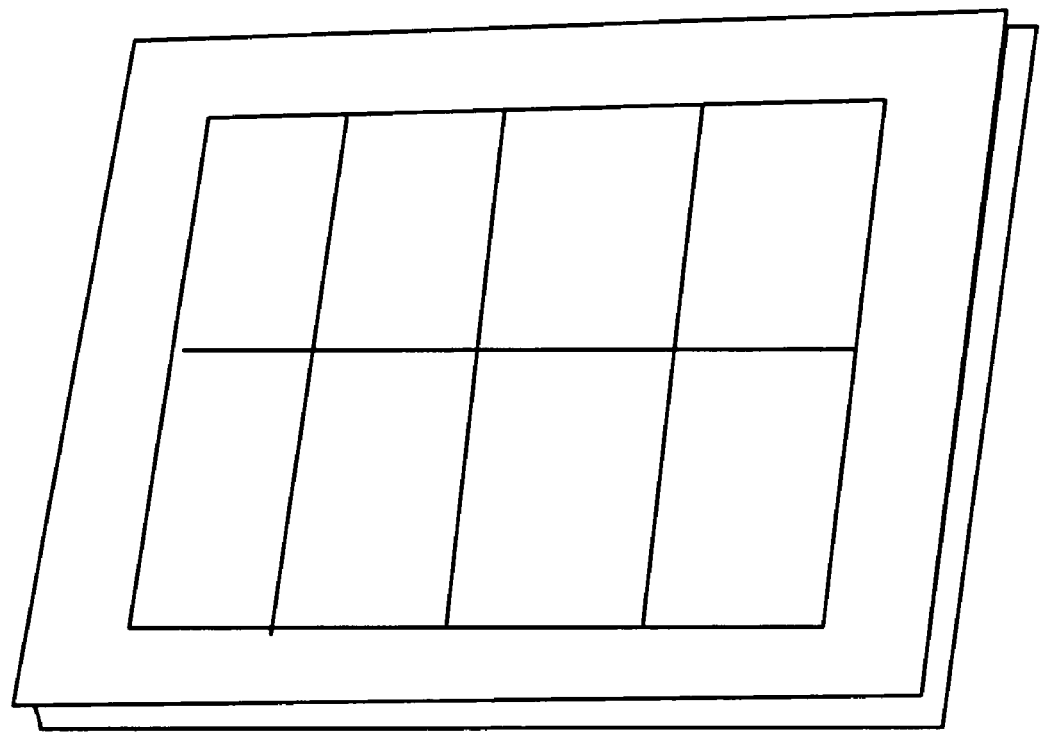
FIG. 4 is an illustration of how a display device is separated into grid areas.

In another embodiment, the computer readable instructions have instructions for calibrating the display devices of the display grid on a sector-by-sector basis since display devices may not have a consistent luminance or color across all areas of the device. Therefore, the display device can be segmented into grid areas and each grid area can be separately calibrated. Typically, the display device is segmented into an eight by eight grid, as shown in FIG. 4. Each grid is then measured to determine the minimal luminance level, from which the RGB values can be adjusted. A pixel array can then be created using the adjusted RGB values, which can be extrapolated into a correction map used to display an image across the entire display grid with consistent color and luminance.

Figure 5:
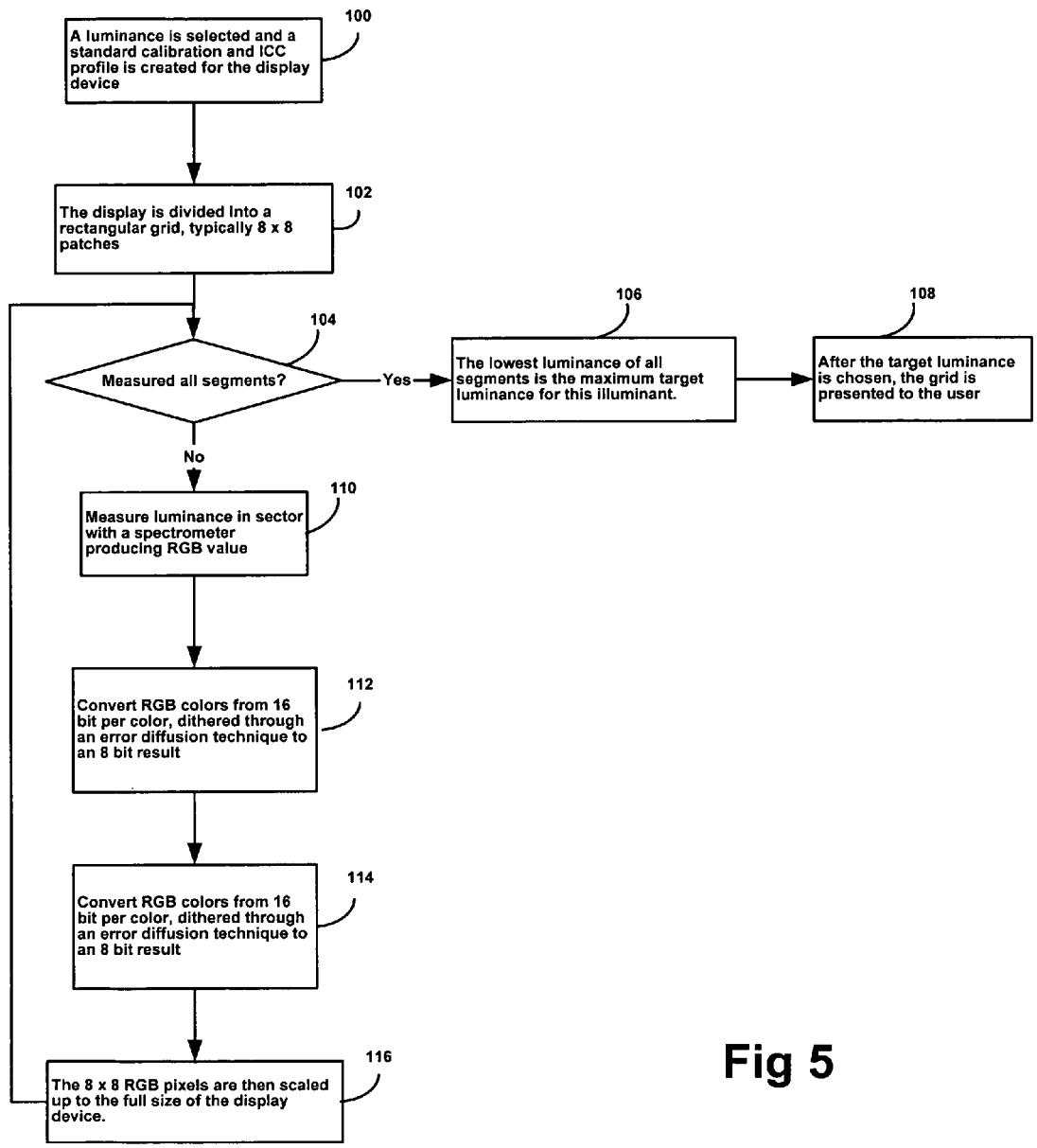
FIG. 5 is a flowchart describing how the display grid is calibrated on a sector by sector basis; schematic of grid areas of a display device.

Referring to FIG. 5, the invention is explained in more detail. A luminance is selected and a standard calibration and ICC profile is created for the display grid at step 100 and as described herein. The display grid is then logically divided into a plurality of segments such as in an eight-by-eight matrix at step 102. It should be noted that each display device could be one segment or a display device could have a plurality of segments. Next, a determination is made as to whether all of the segments have been measured at step 104. If all segments have been measured, the lowest luminance of each segment is the maximum target luminance for the display grid as determined in step 106. If all of the segments have not been measured at step 104, the next segment is measured with a display measuring device at step 110 resulting in RGB values. At step 112, the RGB values are converted from a 16 bit per color format and dithered through an error diffusion process to result in an 8-bit result. The segment measured is then scaled from the section to the entire area of the respective display device of the display grid at step 114.

Referring to FIG. 5, the invention is explained in more detail. A luminance is selected and a standard calibration and ICC profile is created for the display grid at step 100 and as described herein. The display grid is then logically divided into a plurality of segments such as in an eight-by-eight matrix at step 102. It should be noted that each display device could be one segment or a display device could have a plurality of segments. Next, a determination is made as to whether all of the segments have been measured at step 104. If all segments have been measured, the lowest luminance of each segment is the maximum target luminance for the display grid as determined in step 106. After the target luminance is chosen,the grid can be presented to the user in step 108. If all of the segments have not been measured at step 104, the next segment is measured with a display measuring device at step 110 resulting in RGB values. At step 112, the RGB values are converted from a 16 bit per color format and dithered through an error diffusion process to result in an 8-bit result. The segment measured is then scaled from the section to the entire area of the respective display device of the display grid at step 114. The 8×8 RGB pixels can then be scaled up to the full size of the display device as shown in step 116.

Figure 6:
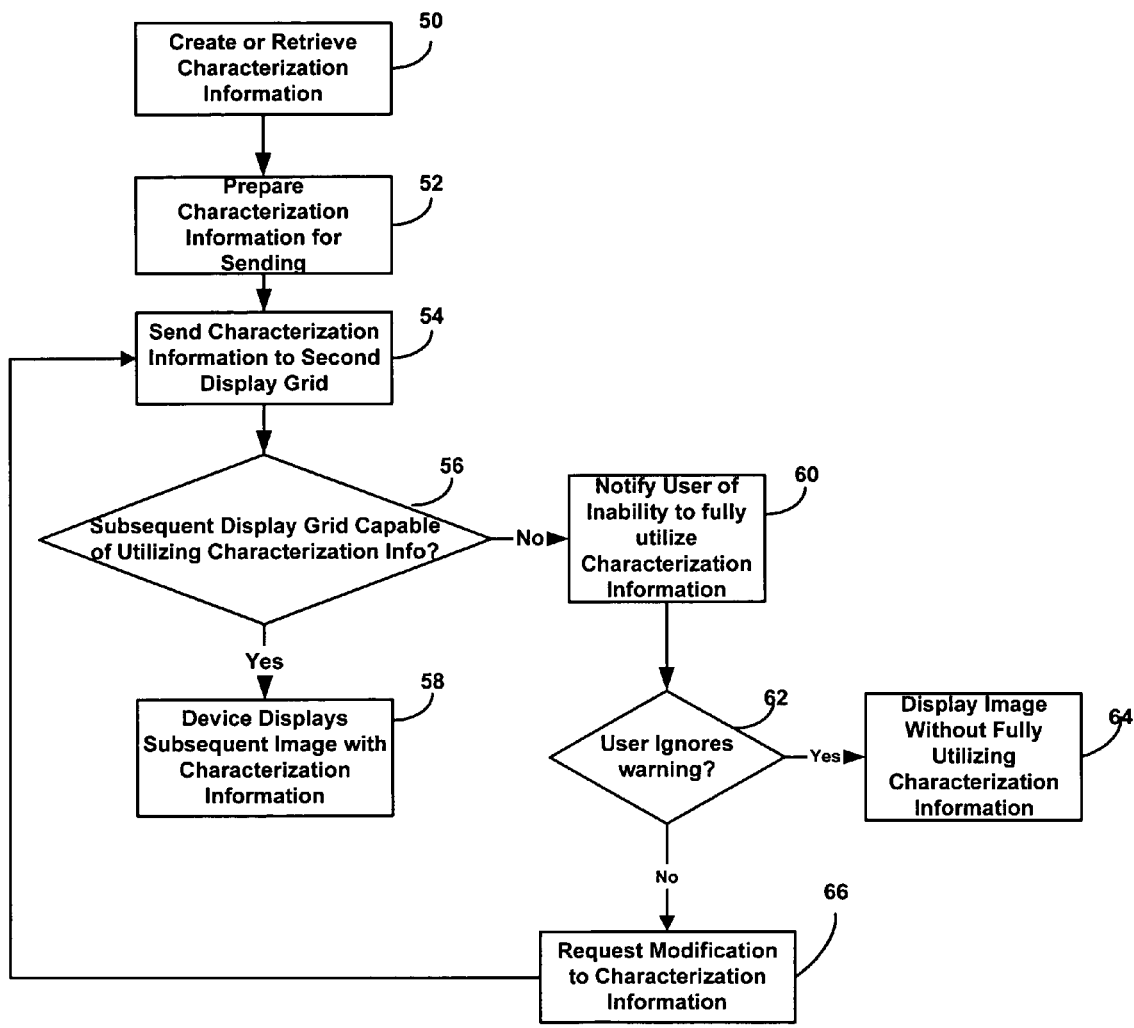
FIG. 6 is a flow chart describing the method used by the invention for sending the characterization information to a subsequent display grid.

Referring now to FIG. 6, the ability of a second display grid to use the information from the first display grid is explained in more detail. Calibration or characterization information is created or otherwise retrieved from a first display grid at step 50. The characterization information is prepared for transmission to the subsequent display grid at step 52. The information is sent to the subsequent display grid in step 54. If the subsequent display grid has the ability to utilize the characterization information received from the first display grid, the spectral transfer function of the first display grid is equal to the spectral transfer function of the second display grid. It is possible, however, that the subsequent display grid lacks the capability to correctly display images using the first display grid's calibration or characterization information. Therefore, the determination as to whether the subsequent display grid can utilize the first display grid's characterization information is made at step 56. If so, the subsequent display grid can use the characterization information for displaying images at step 58. If the subsequent display cannot use the information, the user of the subsequent display grid is notified of this limitation in step 60. The subsequent user can then choose to ignore the notification at step 62 so that subsequent images can be displayed at step 64. However, viewing these images with an uncorrected display grid may not be color accurate. If the user does not wish to ignore the notification, the display grid can be calibrated using white point and luminance settings provided by the first display grid. The user of the subsequent display grid can notify the user of the first display grid of this modality. Should the user of the subsequent display grid not be able to replicate the characterization of the first display grid, then the user of the first device grid can modify the characteristics of the first display grid in step 66 so that the user of the subsequent display grid can properly and accurately view the image.

Figure 7:
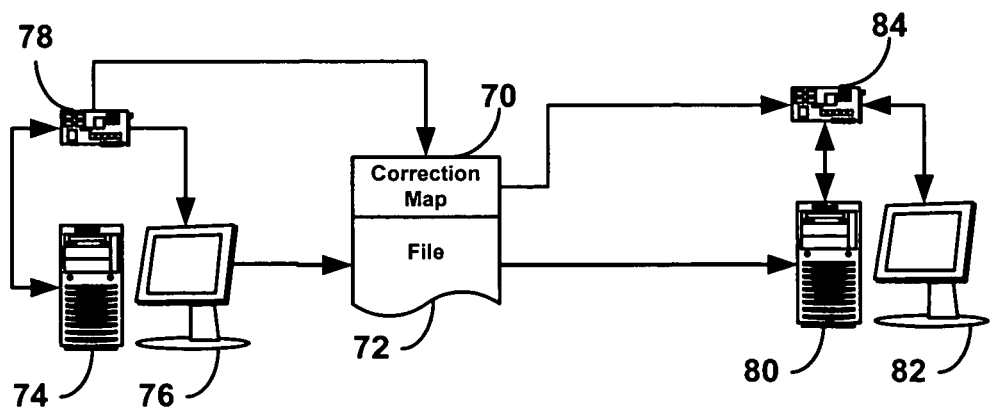
FIG. 7 is a schematic of the hardware associated with the invention.

Referring to FIG. 7, the invention is further described. The characterization information or correction map 70 can be attached to computer readable file, such as an image file 72 to be displayed so that the characterization information travels to the subsequent display grid along with the image file. It should be noted that characterization information, as well as display properties, can be associated with images for transmission to subsequent display grids. An author of electronic information uses author's computer 74 to create a computer readable file, such as an image file 72. This file is displayed for viewing by the author on author's display 76 that is controlled by author's video card 78. The visual appearance of this file is determined by the gamma, white point, and profile for the display in the author's computer 74. The author, therefore, creates the file having specific display properties or characterizations so as to achieve the desired appearance of the file for a viewer. Therefore, author's monitor 76 and author's video card 78 would have certain settings for display properties and characterizations that are used to determine the appearance of the file. The display properties or characterizations are represented as a set of computer readable information shown as display information 70 that can be associated with the file. When the file is transmitted to a recipient, the display or characterization information associated with the file can be transmitted to the recipient viewer with the file. Therefore, the display properties or characterizations are associated with the file and are available to any subsequent recipient viewer when receiving the file from the author and displayed on a display grid.

The recipient would receive the file 72 using recipient's computer 80. The file can be displayed on the recipient's display grid 82 that is controlled by at least one recipient video cards 84. However, recipient's display grid 82 and video cards 84 may not necessarily contain the proper display settings or characterizations to reflect the display properties for the file contemplated by the author. Therefore, the recipient viewer who wishes to view the file in the same manner as the author intended would not have the proper display properties or characterizations for the recipient's display grid. To remedy this problem, computer readable instructions embodied within a computer readable medium of the recipient's computer 80 can read display information 70 associated with file 72 and can adjust recipient's display grid settings and profile for the video cards 84 and recipient's display grid 82 so as to provide the color appearance of an image as intended by the author. Therefore, the recipient can view the image with the appropriate display grid settings to help ensure that the recipient views the same displayed information that was created by the author.

Upon receiving display or characterization information 70, the set of computer readable instructions would determine if the recipient's display grid settings are in need of adjustment. In the event that adjustments are necessary according to the display information, several methods of adjustment can be used. In one embodiment, the adjustments can be made without notification to the recipient and simply be automatically performed by the computer readable instructions of the recipient's computer. In this case, the computer readable instructions can store the original display properties of the recipient's display grid, adjust them according to the received display information, and restore the original display properties when the file is no longer viewed by the recipient. Further, the set of computer readable instructions can inform the recipient viewer that the data in the recipient's display grid are in need of modification according to the received display properties and inquire as to whether the recipient viewer wishes to have such modifications implemented. If so, the modifications are implemented and the file is viewed with such modifications.

Figure 8:
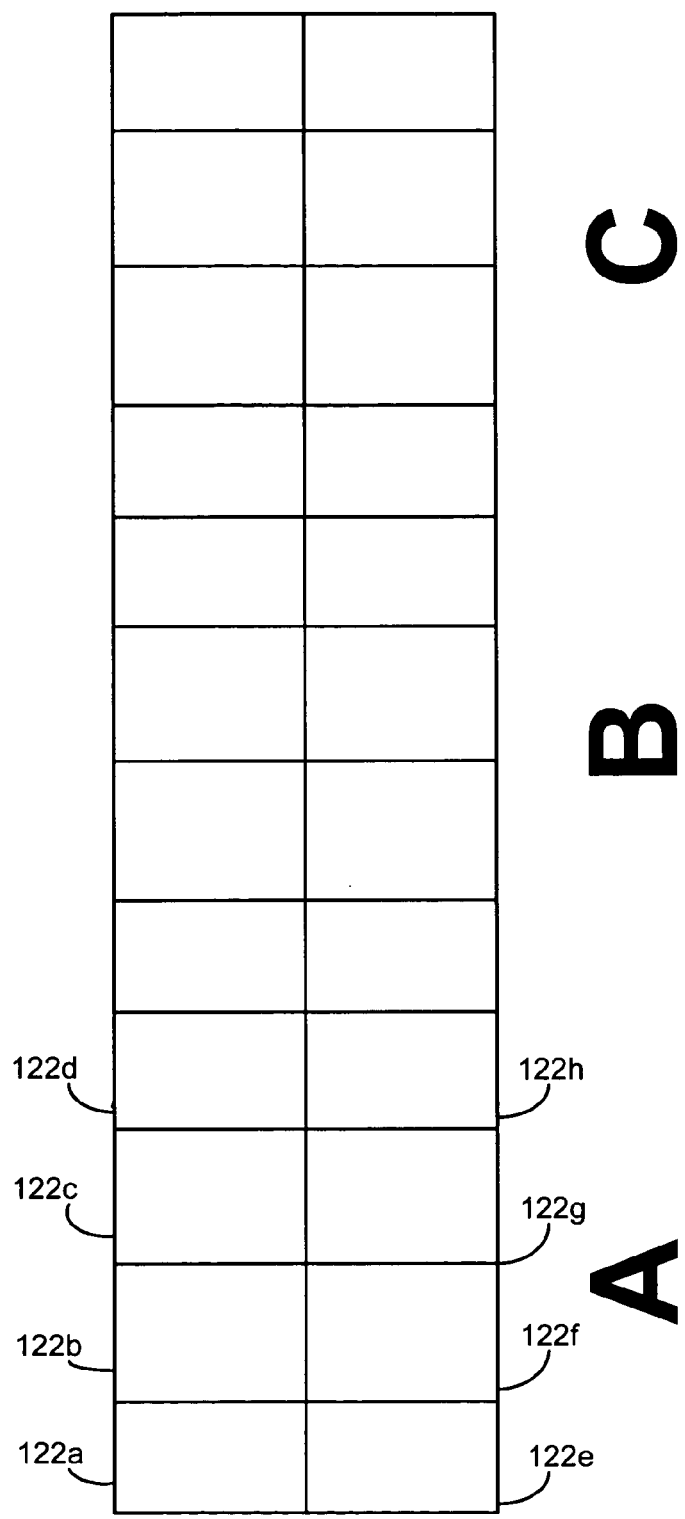
FIG. 8 is a schematic of a display grid.

Referring now to FIG. 8, the segmentation of a display grid is shown in more detail. The display grid of FIG. 8, shown generally as 120, is comprised of three display devices designated generally A, B, and C. For display device A, there are eight segments shown generally as 122a through 122h. The electronic image is displayed across each of the three display devices to form a composite image spanning display device A, B, and C so as to be shown across the entire display grid.

Figure 9:
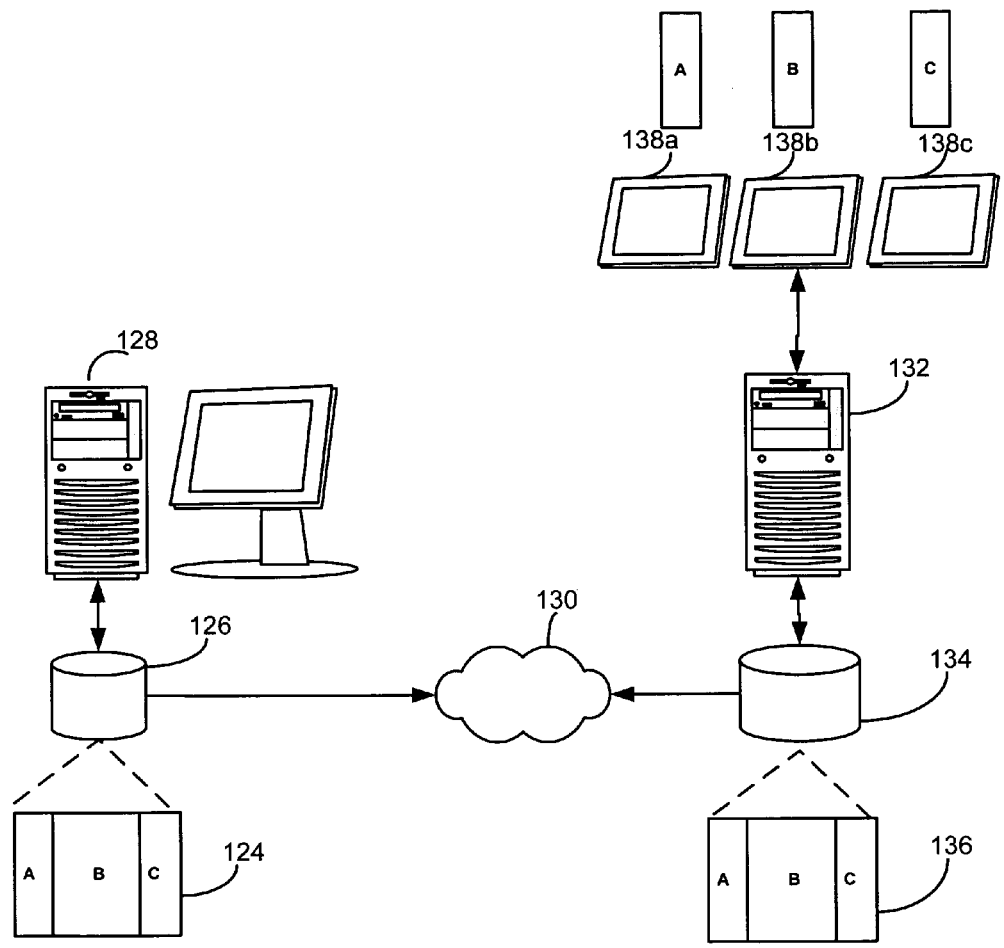
FIG. 9 is a schematic of the invention.

Referring now to FIG. 9, the image 124 is shown segmented into segments A, B, and C and stored in hard drive 126 of computer 128 where it is created. The image can then transmitted through network 130 to a second computer 132 and stored on its hard drive 134. A copy of this image is shown as 136 and segmented into segments A, B, and C. The computer readable instructions on computer 132 can then place segment A on monitor 138A, segment B on monitor 138B and segment C on monitor 138C.

Figure 10:
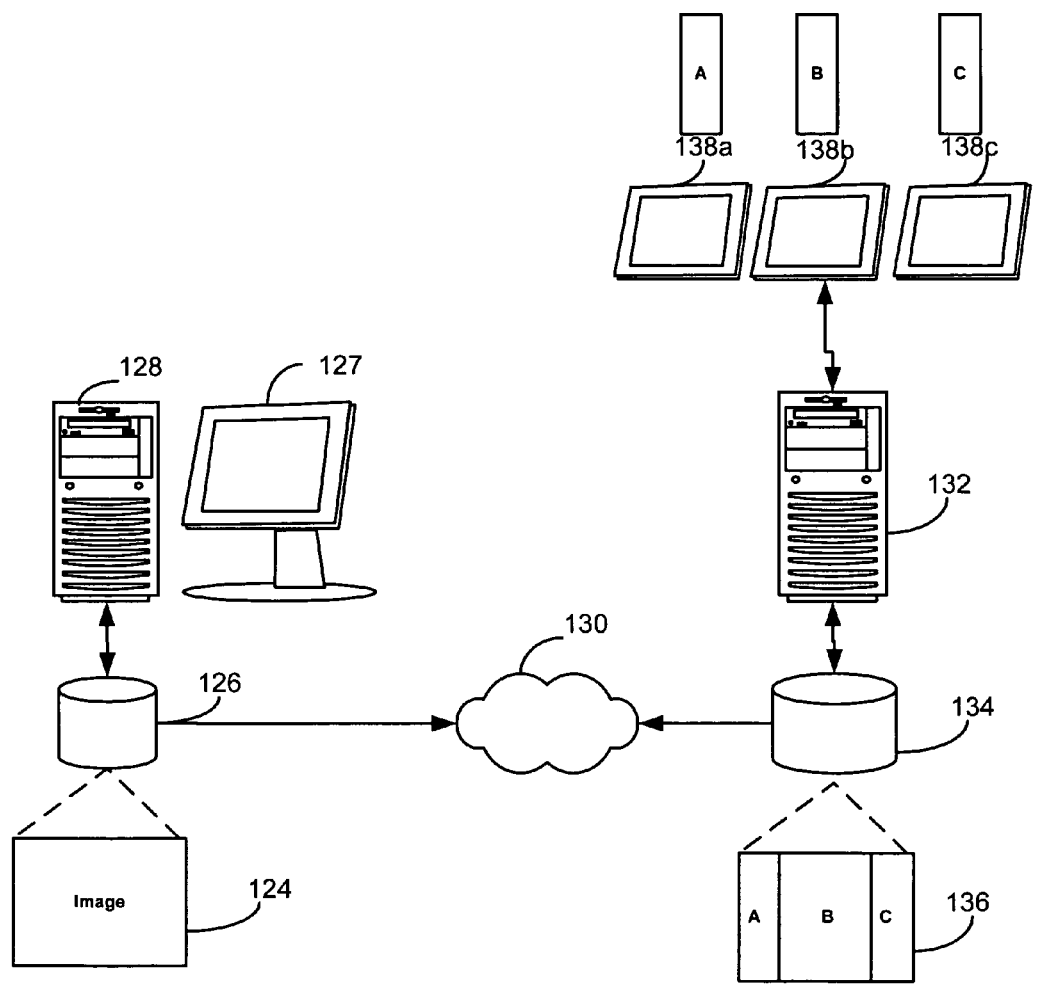
FIG. 10 is a schematic of the invention.

Referring now to FIG. 10, an alternative embodiment is illustrated. In this embodiment, the computer 128 that originates image 124 and stores it on hard drive 126 can display the images on monitor 127. This image can be transmitted to a display grid having display devices 138A through 138C that is communication with a display computer 132. When the image is received in a computer readable medium 134, computer readable instructions on computer 132 segment the image into three segments shown as 136. The segments are then correspondent to the display devices and the image can be displayed across the display grid.

The numerous details set forth herein are provided to facilitate the understanding of the invention and are not provided to limit the scope of the invention. Accordingly, the disclosure of embodiments of the invention is intended to be illustrative of the scope of the invention and is not intended to be limiting. It is intended that the scope of the invention shall be limited only to the extent required by the appended claims.

The invention claimed is:

1. A system of calibrating a display grid having a plurality of display devices comprising:
a computer readable medium; and,
a set of computer readable instructions embodied in said computer readable medium for initializing lookup table values representing default luminance levels of said first display device, measuring the output of each one of said plurality of display devices of said display grid, determining a gray ramp for each display of said display grid from said output measurements, mapping said gray ramp to L* of CIELAB color model of said first display device, adjusting said lookup table values of each display of said display grid according to said gray ramp mapping and L*, determining a pixel array according to said lookup tables for each of said display devices of said display grid, extrapolating said pixel array into a correction map for each of said display devices of said display grid so that said correction map can be used to display an image with consistent luminance and color across said display grid.

2. The system of claim 1 wherein said computer readable instructions include instructions for receiving an electronic image to be displayed across said display grid and segmenting said electronic image into segments corresponding to at least one display device of said display grid.

3. The system of claim 2 wherein said computer readable instructions include instructions for modifying at least one segment of said electronic image according to said correction map.

4. The system of claim 1 wherein said computer readable instructions include instructions for transmitting luminance information for use by a second display grid.

5. The system of claim 4 wherein said computer readable instructions include instructions for receiving information representing a determination of said second display grid's ability to utilize said luminance information.

6. The system of claim 5 wherein said computer readable instructions include instructions for notifying a user if said second display grid cannot utilize said luminance information.

7. The system of claim 1 wherein said correction map includes pixel multipliers for each pixel of each display device.

8. A system for calibrating a display grid comprising:
a computer readable medium;
a plurality of display devices in communications with said computer readable medium; and,
a set of computer readable instructions embodied in said computer readable medium for initializing lookup table values representing default luminance levels of each one of said display devices of said display grid, segmenting said display devices into a plurality of grid areas, measuring the output of said grid areas according to said initial lookup table values, determining a grey ramp according to said output measurements, mapping said gray ramp to L* of CIELAB color model of said first display device, adjusting said lookup table values according to said gray ramp mapping and L*, extrapolating said lookup table values into a correction map so that said correction map can be used to display an image with consistent color and luminance across said display grid.

9. The system of claim 8 wherein said correction map includes pixel multipliers for each pixel of each display device.

10. The system of claim 8 wherein said computer readable instructions include instructions for receiving an electronic image to be displayed across said display grid and segmenting said electronic image into segments corresponding to at least one display device of said display grid.

11. The system of claim 10 wherein said computer readable instructions include instructions for modifying at least one segment of said electronic image according to said correction map.

12. The system of claim 8 wherein said computer readable instructions include instructions for transmitting luminance information for use by a second display grid.

13. The system of claim 12 wherein said computer readable instructions include instructions for receiving information representing a determining of said second display grid's ability to utilize said luminance information.

14. The system of claim 13 wherein said computer readable instructions include instructions for notifying a user if said second display grid cannot utilize said luminance information.

* * * * *